M. P. SMITH.
Improvement in Fruit-Drying Apparatus.
No. 131,125.  Patented Sep. 3, 1872.
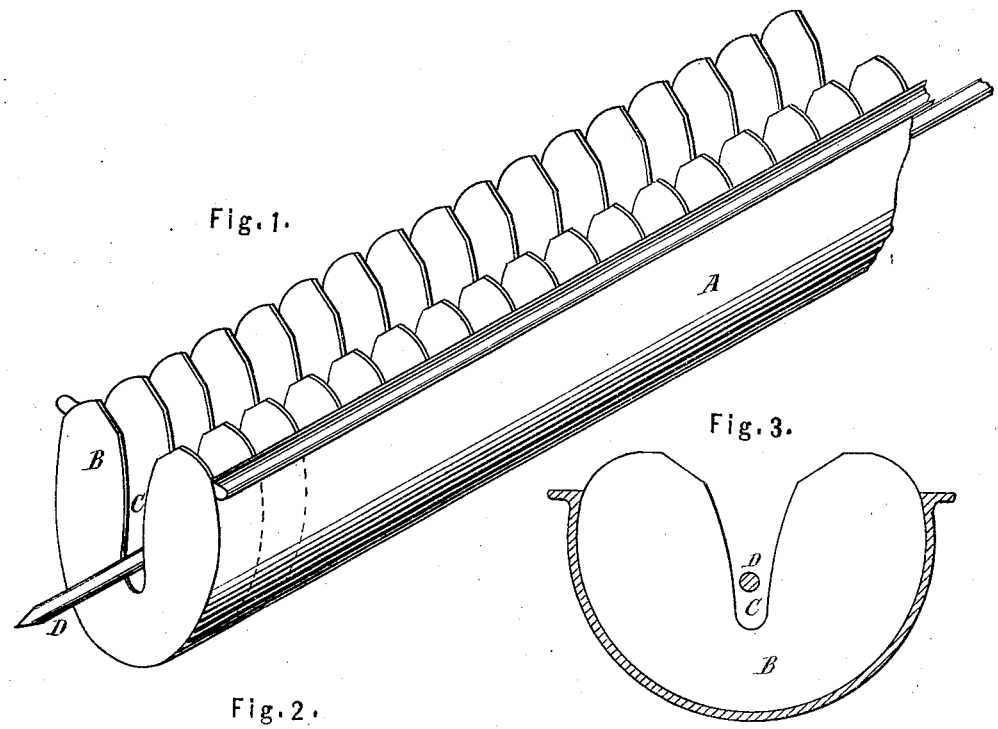
Fig. 1.
Fig. 3.
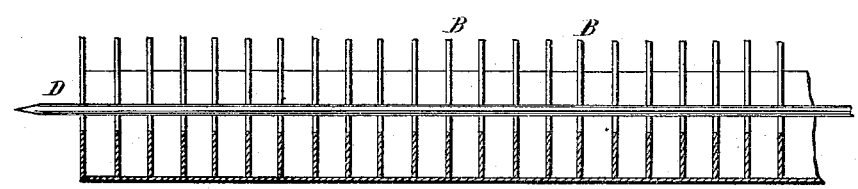
Fig. 2.
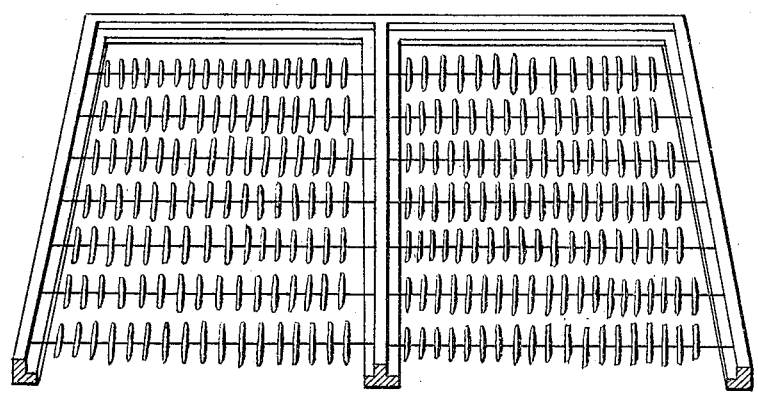
Fig. 4.
Witnesses:  Inventor:

UNITED STATES PATENT OFFICE.

MARSHALL P. SMITH, OF BALTIMORE, MARYLAND.

IMPROVEMENT IN FRUIT-DRYING APPARATUS.

Specification forming part of Letters Patent No. 131,125, dated September 3, 1872.

Specification describing an Improvement in Process for Drying Fruits and Vegetables, invented by MARSHALL P. SMITH, of Baltimore, in the State of Maryland.

The plan heretofore followed of spreading the substance to be dried on trays or platforms has the disadvantage that the pieces, being generally in slices, lie flat upon the trays, and only one side is presented to the ascending heated air, by which means the drying is greatly retarded. Another disadvantage is, that the pieces lying closely together leave but a limited space for the passage of the hot air, and if separated to any extent but a small quantity can be spread on a tray.

In the practical operation of my vertical screw-drier patented September 13, 1870, these defects early presented themselves, and have been removed by the following means: Instead of spreading the fruit or vegetables on trays I string them on wires or rods, separating the pieces by a small space, and these rods or wires I rest upon the frames of the movable trays, thereby dispensing with the need of any wire cloth or other bottom to the tray. By this method from two to four fold the quantity of material can be placed on each platform, and both sides of the pieces of fruit or vegetable are dried with equal rapidity.

To perform this operation rapidly and perfectly I have devised the following instrument or tool, referring to the drawing, in which—

Figure 1 is a perspective view. Fig. 2 is a longitudinal and Fig. 3 is a cross section.

I make a trough, A, of tin or other metal, the bottom of which is round, square, or polygonal, and the length is about two inches shorter than the wires or rods to be used. This trough is divided off into spaces of about half an inch, more or less, by the segments B.

These segments are all of same pattern, and have a slot cut in them, as shown at C. When in position in the troughs, these slots form a continuous channel through which the wire or rod D can be passed. In place of the wire or rod a cord may be used, which may be fastened to the frames by pins or otherwise, and to facilitate the insertion of the cord a long needle may be used. This forms the tool.

In operation, the pieces or slices of vegetable or fruit are dropped into the spaces between the segments B and the wire or rod D, which is sharpened at the end, is passed through the slot-channel C, piercing the pieces of fruit or vegetable, which are, of course, equidistant from each other. The wire or rod is then lifted out of the tool and placed on the frame of the tray or platform, as shown in Fig. 4.

In my first experiments I intended to place these segments on an endless belt, revolving slowly toward the point of the rod, which should be held stationary; but I prefer the simple plan herein described.

What I claim as new, and desire to secure by Letters Patent, is—

1. The separating-tool herein described, when constructed substantially in the manner and for the purposes herein set forth.

2. The process of drying fruits and vegetables by stringing them on wires, rods, or cords, and placing them on rising or falling platforms within a chamber supplied with a current or currents of heated air, substantially as described.

MARSHALL P. SMITH.

Witnesses:
    JAS. W. KIRKMAN,
    JAMES McEVOY.